United States Patent
Goransson et al.

(10) Patent No.: US 7,151,951 B2
(45) Date of Patent: Dec. 19, 2006

(54) USING BEAMFORMING AND CLOSED LOOP TRANSMIT DIVERSITY IN A MULTI-BEAM ANTENNA SYSTEM

(75) Inventors: Bo Goransson, Stockholm (SE); Andrew Logothetis, Uppsala (SE); Bo Hagerman, Stockholm (SE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 264 days.

(21) Appl. No.: 10/328,723

(22) Filed: Dec. 23, 2002

(65) Prior Publication Data

US 2004/0121810 A1  Jun. 24, 2004

(51) Int. Cl.
*H04M 1/00* (2006.01)
*H03C 7/02* (2006.01)
*H04B 1/06* (2006.01)
*H04B 1/185* (2006.01)
*H01Q 3/00* (2006.01)

(52) U.S. Cl. .................. 455/562.1; 455/101; 455/25; 455/63.4; 455/272; 342/377; 370/317

(58) Field of Classification Search ............ 455/562.1, 455/575.7, 63.1, 429; 342/373, 372, 383, 342/377; 370/335, 321, 328, 334, 317; 375/147, 375/140
See application file for complete search history.

(56) References Cited

U.S. PATENT DOCUMENTS

| | | | | |
|---|---|---|---|---|
| 5,434,578 A * | 7/1995 | Stehlik | ........................ | 342/383 |
| 5,634,199 A * | 5/1997 | Gerlach et al. | ............. | 455/63.1 |
| 6,075,484 A * | 6/2000 | Daniel et al. | ............... | 342/372 |
| 6,091,788 A * | 7/2000 | Keskitalo et al. | ........... | 375/347 |
| 6,094,165 A * | 7/2000 | Smith | ......................... | 342/373 |
| 6,108,323 A * | 8/2000 | Gray | .......................... | 370/335 |
| 6,192,256 B1 * | 2/2001 | Whinnett | .................. | 455/562.1 |
| 6,320,540 B1 * | 11/2001 | Meredith | .................... | 342/377 |
| 6,480,524 B1 * | 11/2002 | Smith et al. | ................ | 375/140 |
| 6,647,276 B1 * | 11/2003 | Kuwahara et al. | ....... | 455/562.1 |
| 6,665,545 B1 * | 12/2003 | Raleigh et al. | .......... | 455/562.1 |
| 6,694,155 B1 * | 2/2004 | Chin et al. | ............... | 455/562.1 |
| 6,778,507 B1 * | 8/2004 | Jalali | ......................... | 370/317 |
| 6,788,250 B1 * | 9/2004 | Howell | ....................... | 342/372 |
| 2002/0060993 A1 * | 5/2002 | Dent | ......................... | 370/321 |
| 2002/0093922 A1 * | 7/2002 | Grilli et al. | ................. | 370/328 |
| 2002/0168974 A1 * | 11/2002 | Rosen et al. | ............... | 455/429 |
| 2003/0142731 A1 * | 7/2003 | Bergel | ........................ | 375/147 |
| 2003/0231606 A1 * | 12/2003 | Wu et al. | .................... | 370/334 |

FOREIGN PATENT DOCUMENTS

| EP | 0 999 658 A | 5/2000 |
|---|---|---|
| EP | 0 999 658 | 10/2000 |

(Continued)

OTHER PUBLICATIONS

Anderson, et al., Adaptive Antennas for GSM and TDMA Systems, IEEE Personal Communications, vol. 6, pp. 74-86, Jun. 1999.

(Continued)

*Primary Examiner*—George Eng
*Assistant Examiner*—Kiet Doan
(74) *Attorney, Agent, or Firm*—Roger S. Burleigh

(57) ABSTRACT

In controlling a multi-beam antenna system for downlink wireless communication, beamforming and closed loop transmit diversity signaling are combined. Each beam signal is adjusted at the transmitter based on feedback from a wireless mobile communication station such that the signals received at the wireless mobile communication station can be coherently combined.

30 Claims, 3 Drawing Sheets

FOREIGN PATENT DOCUMENTS

| | | |
|---|---|---|
| WO | 01 69814 A | 9/2001 |
| WO | WO 01/69814 | 9/2001 |

OTHER PUBLICATIONS

Goransson, et al., Adaptive Antennas in WCDMA Systems—Link Level Simulation Results Based on Typical User Scenarios, IEEE VTC 2000 Fall, pp. 157-164, vol. 1.

Soni, et al., Transmit Beamforming Combined With Diversity Techniques for CDMA 2000 Systems, IEEE ICASSP 2001, pp. 1029-1032.

Pedersen, et al., A Simple Downlink Antenna Array Algorithm Based on a Hybrid Scheme of Transmit Diversity and Conventional Beamforing, IEEE VTC 2001, pp.58-62.

Katz, et al., Extension of Space-Time Coding to Beamforming WCDMA Base Stations, IEEE VTC 2000 Spring, pp. 1230-1234, vol. 2.

Hottinen, et al., Closed-loop Transmit Diversity Techniques for Multi-Element Transceivers, IEEE VTC 2000 Fall, pp. 70-73, vol. 1.

Enhance the Beamforming Feature of the Multiple Antenna Tx Diversity, TSGR1#15(00)-1065, Aug. 22-25, 2000 (8 pages).

Description of the Eigenbeamformer Concept (update) and Performance Evaluation, TSGR1#19(01)-0203, Feb.27-Mar. 2, 2001 (9 pages).

Derek Gerlach et al., "*Base Station Transmitter Antenna Arrays with Mobile to Base Feedback*", 1993 IEEE, 5 pgs.

Gerlach D, et al., "Base Station Transmitter Antenna Arrays with Mobile to Base Feedback", Signals, Systems and Computers, 1993, 1993 Conference Record of the Twenty-Seventh Asilomar Conference on Pacific Grove, CA, USA Nov. 1-3, 1993, Los Alamitos, CA, USA, IEEE Comput. Soc., Nov. 1, 1993, pp. 1432-1436, XP010096455, ISBN: 0-8186-4120-7.

\* cited by examiner

USING BEAMFORMING AND CLOSED LOOP TRANSMIT DIVERSITY IN A MULTI-BEAM ANTENNA SYSTEM

FIELD OF INVENTION

The invention relates generally to wireless communication transceivers and, more particularly, to wireless communication transceivers that utilize a multi-beam antenna system.

BACKGROUND OF THE INVENTION

Advanced downlink beamforming techniques are particularly important in Third and Future Generation Cellular Communication Systems due to asymmetric services present in such communication systems.

The eight documents listed below are incorporated herein by reference, and are hereinafter referred to by the corresponding numerals in square brackets shown below.
[1] S. Anderson, B. Hagerman, H. Dam, U. Forssen, J. Karlsson, F. Kronestedt, S. Mazur, K. J. Molnar, *Adaptive antennas for GSM and TDMA systems*, IEEE Personal Communications, Vol. 6, No. 3, pp. 74–86, June 1999.
[2] Bo Goransson, Bo Hagerman, Jozsef Barta, *Adaptive Antennas in WCDMA Systems—Link Level Simulation Results Based on Typical User Scenarios*, IEEE VTC 2000 Fall, pp. 157–64, Vol. 1.
[3] R. A. Soni, R. M. Buchrer, R. D. Benning, *Transmit Beamforming Combined With Diversity Techniques for CDMA 2000 Systems*, ICASSP 20001.
[4] K. I. Pedersen and P. E. Mogensen, *A Simple Downlink Antenna Array Algorithm Based on a Hybrid Scheme of Transmit Diversity and Conventional Beamforming*.
[5] M. Katz, J. Ylitalo, *Extension of Space-Time Coding to Beamforming WCDMA Base Stations*, IEEE VTC 2000 Spring, pp. 1230–4 m, Vol. 2.
[6] A. Hottinen, O. Tirkkonen, R. Wichman, *Closed-Loop Transmit Diversity Techniques for Multi-Element Transceivers*, IEEE VTC 2000 Fall, pp. 70–3 vol. 1.
[7] *Enhance the beamformer feature of the multiple antenna Tx Diversity*, TSGR1 #15 (00)-1065.
[8] *Description of the eigenbeamformer concept (update) and performance evaluation*, TSGR1 #19 (01)-0203.

Steering a radiated beam in the wrong direction (the so called beam pointing error problem), or using the wrong beam in a fixed multi-beam antenna system to transmit data to a specific mobile has serious consequences to system capacity. A mobile terminal radiated by a beam that points in a wrong direction will request more power to satisfy its desired Quality of Service (QoS). Since the peak of the beam is pointing in a direction other than the intended user, many other mobiles falling within the beam will experience an increased level of interference. Consequently, these mobiles will request more power to meet their own QoS, quickly using up the scarce power resources of the communication system. FIG. 1 illustrates situations where beam pointing errors will occur.

Beamforming solutions that are currently in use or have previously been proposed are discussed below.

Adaptive antenna arrays have been used successfully in GSM and TDMA systems, as reported in [1]. The aim in an adaptive antenna array system is to replace the conventional sector antenna by two or more closely spaced antenna elements. The key idea in antenna array systems is to direct the radiated energy from the array to the specified user of interest, while at the same time the antenna array system seeks to minimize the interference to other users. Such strategies have been shown in GSM and TDMA systems to yield improved performance, measured in increased system capacity and/or increased range, as reported in [1]. In [2], results show that the performance gain obtained by an advanced antenna system could be substantial compared to an ordinary sector covering system. Broadly speaking, adaptive antenna systems are grouped into two categories: a) fixed-beam systems, where radiated energies are directed to a number of fixed directions; and b) adaptive systems, where the radiated energy is directed towards any desired location.

In Frequency Division Duplex (FDD) mode of communication, such as WCDMA-FDD, the uplink data (from mobile to base station) and the downlink data (from base station to mobile) are transmitted on different frequencies. The frequency gap between uplink and downlink almost surely ensures different fading channel realizations. Thus, while the angle of arrivals and angle of departures of the signals are reasonably the same, the channel attenuations on every uplink and downlink path are not.

In FDD systems the downlink beam is computed using uplink measurements. This strategy will yield beam pointing errors, especially when the spread of the angles of arrival is large (larger than the beamwidth). Beam pointing errors will also occur when the angular spread is small and the mean of the spread is located near the cross over region of a fixed multi-beam antenna system. See FIG. 1 for an illustration of this problem.

Time varying multipath fading seriously degrades the quality of the received signals in many wireless communication environments. One method that mitigates the effects of deep fades and provides reliable communications is the introduction of redundancy (diversity) in the transmitted signals. The added redundancy can take place in the temporal or the spatial domain. Temporal diversity is implemented using channel coding and interleaving, while spatial diversity is achieved by transmitting the signals on spatially separated antennas or using differently polarized antennas. Such strategies ensure independent fading on each antenna.

Spatial transmit diversity can be subdivided into closed loop or open loop transmit diversity modes, depending on whether or not feedback information is transmitted from the receiver back to the transmitter. The $3^{rd}$ Generation Partnership Project, Release 99, mandates that all mobile user equipment must support transmit diversity using two transmit diversity antennas. One open loop mode and two closed loop modes must be supported for the downlink dedicated physical channels.

Open loop transmit diversity employs a space time block coding transmit diversity (STTD). The STTD encoding is applied on blocks of four consecutive channel bits. The mobile user equipment does not transmit any feedback information back to the transmitting diversity antennas.

In closed loop transmit diversity, the spread and scrambled signal is subject to phase (in Mode 1), or phase and amplitude (in Mode 2) adjustments prior to transmission on two antennas. The antenna weights are determined by the mobile user and transmitted to the base station via the FeedBack Information (FBI). Transmit diversity in these two modes can be seen as a beamforming method, where the beamforming weights at the base station are determined by each and every mobile user.

Closed loop transmit diversity schemes attempt to adjust the phases and amplitudes of the transmitted signals on the diversity antennas by using feedback information from each mobile user. Such strategy does not consider the overall system optimality, since the transmit diversity signals are radiated in the entire cell causing interference to other users. When transmit antennas are separated by more than half a wavelength, then grating lobes are generated. These grating lobes can be viewed as a form of a beam pointing error.

On the other hand, adaptive antenna systems are capable of steering the radiated energy towards (or from) the desired user, while at the same time minimizing the interference to other users, as reported in [1]. The major drawback of such strategy is the beam pointing error problem, which usually becomes more severe when the mobile users move from one fixed beam to the next.

Other known approaches involving beamforming and transmit diversity are described below.

A single antenna array employing open loop polarization transmit diversity on a single beam. A hybrid scheme consisting of a conventional beamformer (constructed using a single dual polarized antenna array) and open loop transmit diversity was studied in [4] for WCDMA systems. The two symbols generated from the space-time block coder are each transmitted on a different polarized antenna element. A conventional Bartlett (phase rotating) beamformer is used to direct the energy in the desired user's location.

A single antenna array employing open loop transmit diversity on two selected beams. In [5] a WCDMA link simulation involving a moving mobile and a fixed beam antenna system is presented. The base station decides from uplink measurements a set of two beams to transmit for the downlink. The base station then transmits the same symbols on different beams and in different time intervals. Equal amounts of power on each beam are used. Thus, the channel conditions are not matched, which implies that more power may be transmitted than necessary. If the angular spread of the mobile user is located within the beamwidth of the first downlink beam, then the power in the second beam will be degraded and at the same time additional interference to other users within the cell will be introduced.

An antenna array with antenna weights determined by feedback signalling with or without the aid of uplink measurements: In [6], downlink beamforming using a single antenna array forming two beams towards each mobile user is presented. Open loop transmit diversity signalling is used per beam. The antenna weights forming the first beam are determined by uplink measurements, while the antenna weights forming the second beam are computed by the mobile and transmitted to the base station. In [6], an alternative beamforming method is proposed, where a single beam is directed towards the mobile and the angle of departure of the beam is determined by the mobile user. In [7], an antenna array is proposed at the base station and the antenna weights are determined by the mobiles and transmitted to the base station by feedback signalling. Knowledge of the multi-element array structure for every base station is crucial. Thus, the base station antenna system design on every site must be known to every mobile user. Changes in the standards are required to accommodate these methods. If a mobile user dictates the antenna weights to be used for transmission, then the overall system optimality can be compromised.

A diversity antenna array with antenna weights determined by feedback signalling. Recently there have been proposals to the 3 GPP to standardize transmit diversity methods for four transmit antennas. One contribution has been the eigenbeamformer reported in [8], where the mobile user determines the optimal antenna weight by performing an eigendecomposition of the channel matrix. The optimal antenna weight vector is given by the principal eigenvector. In order to reduce the feedback rate, the eigenvectors corresponding to the two or more largest eigenvalues are fed back on a slow basis, i.e. the update of these vectors is done during several frames in WCDMA. On a fast level, e.g. slot by slot, the best weight at this particular fading pattern is chosen. Since the scheme is proposed to be mandatory in the terminal, each mobile terminal must implement the computationally expensive eigendecomposition algorithm. Since the feedback format must be standardized, this method is not adaptable to cover more or less antenna elements than the proposed four.

Diversity antenna systems with antenna arrays in each diversity branch. In [3] Orthogonal Transmit Diversity (OTD) and Space-Time Spreading (STS) are proposed to be used on each diversity branch for the CDMA2000 standard. Two groups of antenna arrays are separated far apart to ensure diversity. Beamforming is used on each group by placing the antenna elements within the group half a wavelength apart. No standard changes are required. In [7], diversity antenna systems are proposed for WCDMA that require modifications of the existing standards. Both [3] and [7] use distributed antenna arrays and the attendant addition of hardware complexity.

It is therefore desirable to avoid beam pointing errors without incurring disadvantages such as mentioned above.

According to the invention, the beam pointing error problem can be alleviated if data to a specific mobile is radiated using more than one downlink beam. The signal on each beam is also adjusted such that the received signals at each mobile can be coherently combined, thus minimizing the total transmit power while at the same time avoiding beam pointing errors. This is accomplished by combining beamforming and closed loop transmit diversity signalling.

DETAILED DESCRIPTION

Figure 1:
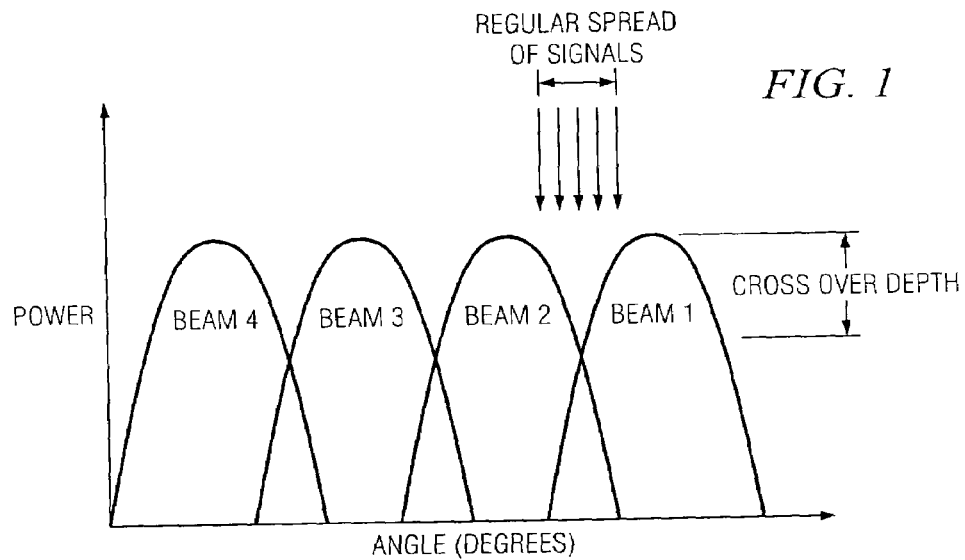
FIG. 1 graphically illustrates exemplary situations where beam pointing errors can occur in known systems.
Figure 2:
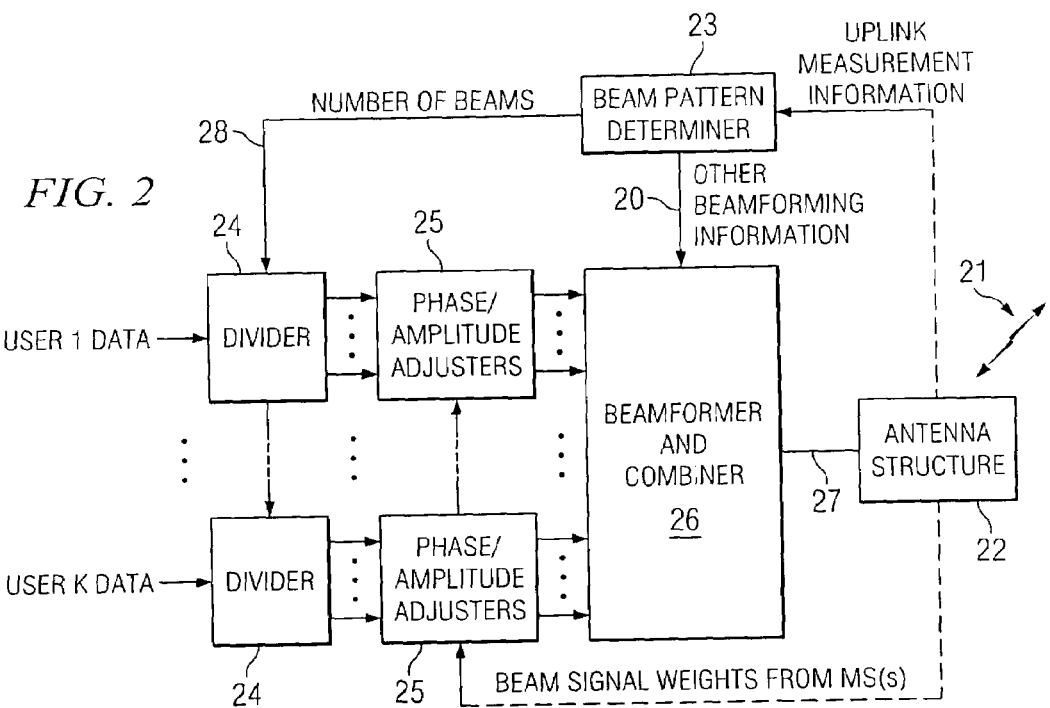
FIG. 2 diagrammatically illustrates pertinent portions of exemplary embodiments of a wireless communication transceiver apparatus with a multi-beam antenna system according to the invention.

FIG. 2 diagrammatically illustrates pertinent portions of exemplary embodiments of a wireless communication transceiver apparatus with a multi-beam antenna system according to the invention. Examples of the transceiver apparatus of FIG. 2 include base stations for use in cellular communication systems. The transceiver apparatus can communicate with mobile communication stations via a wireless communication link illustrated generally at 21. On downlink, the transceiver apparatus of FIG. 2 uses multiple antenna beams to transmit information to a mobile station (MS). Advantageously according to the invention, the transceiver of FIG. 2 combines the downlink beamforming principles of conventional adaptive antenna systems with the feedback signaling of conventional closed loop transmit diversity systems to obtain improved performance relative to conventional adaptive antenna systems.

The antenna structure 22 of FIG. 2 can implement, for example, a conventional fixed multi-bema antenna system. A beam pattern determiner 23 can use conventional techniques to determine the necessary downlink beam forming parameters, for example the number of beams, and other beamforming information such as antenna weights. These downlink beamforming parameters can be determined, for example, in response to conventionally available uplink measurement information. As one example, the beam pattern determiner 23 can select those beams which exhibit the strongest uplink power and/or quality measurements. Information indicative of the number of beams is provided at 28 to a plurality of signal dividers 24, each of which receives a data signal from a respective one of K users. The data received by the dividers 24 can be, for example, spread and scrambled data associated with CDMA or WCDMA communication. The dividers 24 divide each incoming user data stream according to the number of beams selected by the beam pattern determiner 23. For example, if two beams are indicated at 28, then each divider 24 divides its associated input data stream into two identical output data streams, each of which is in turn identical to the input data stream.

The data streams output by each divider 24 (also referred to herein as beam signals) are input to a corresponding phase/amplitude adjuster 25. Each phase/amplitude adjuster 25 can use conventional techniques to make desired phase and/or amplitude adjustments in any of the beam signals that it receives. The phase/amplitude adjusters 25 perform their phase/amplitude adjustment operations in response to beam signal weights (also referred to herein as beam weights) received from the mobile station(s) for which the K user data streams are intended. The phase/amplitude adjustment enables the mobile station(s) to coherently combine the signals received from the transceiver of FIG. 2.

Each mobile station can use conventional techniques to calculate the beam signal weights for the beam signals associated therewith. For example, in conventional WCDMA systems, the mobile station can use any orthogonal channel to calculate the beam signal weights, for example S-CPICH (Secondary Comment PIlot CHannel). The beam signal weights calculated by the mobile station can be transmitted from the mobile station to the transceiver of FIG. 2 using conventional techniques, for example, the FBI (FeedBack Indicator) or FSM (Feedback Signaling Message) used in conventional WCDMA systems.

The phase and/or amplitude-adjusted beam signals produced by the phase/amplitude adjusters 25 are input to a beamformer/combiner 26 which can use conventional beamforming and combining techniques to produce at 27 conventionally-formatted antenna signaling which can be used to operate a conventional multi-beam antenna system (included within antenna structure 22) for downlink transmission. The beamforming operations of beamformer/combiner 26 are performed in response to the beamforming information 20, for example antenna weights, produced by beam pattern determiner 23.

Figure 3:
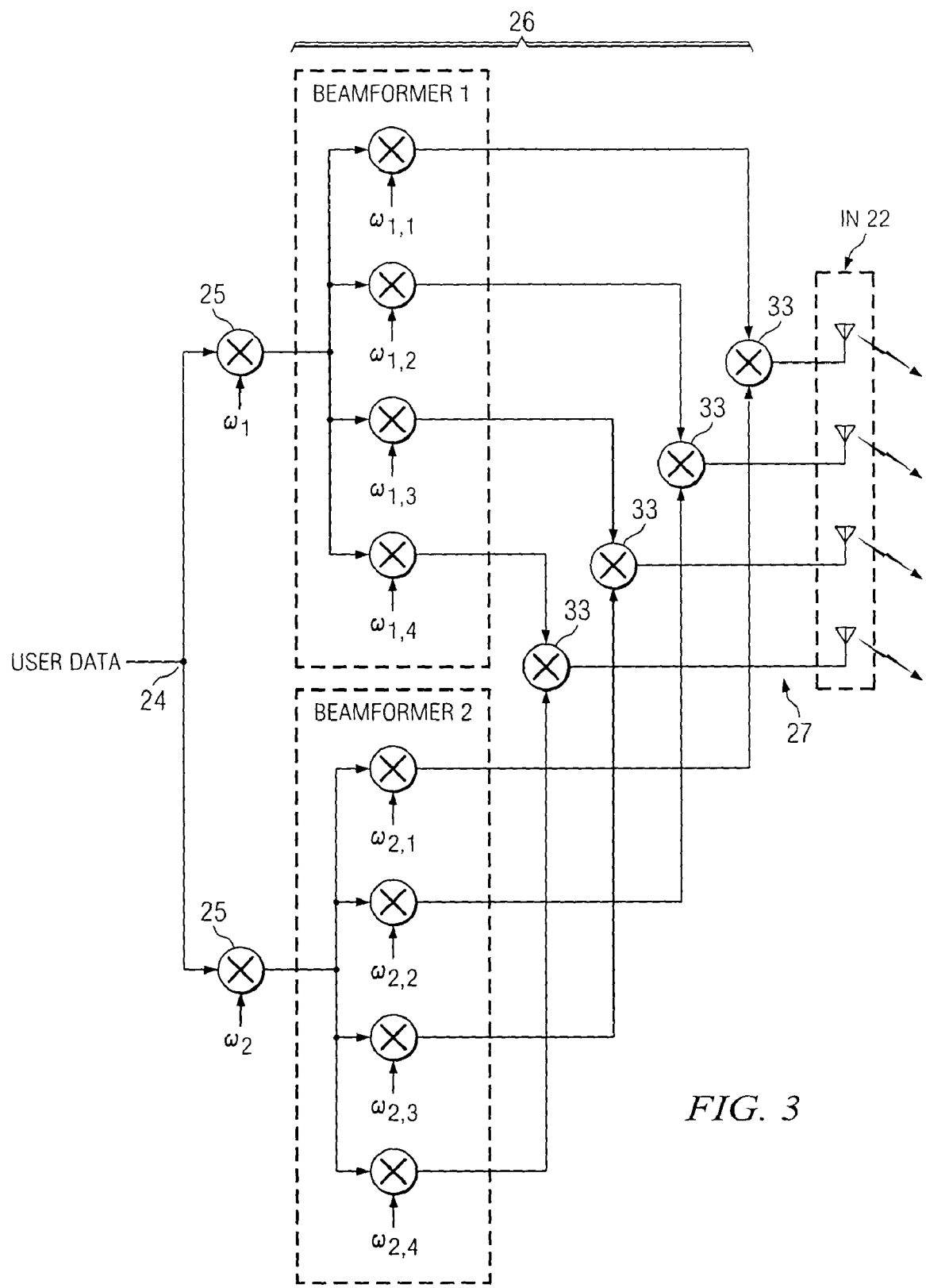
FIG. 3 diagrammatically illustrates some of the exemplary embodiments of FIG. 2 in more detail.

FIG. 3 diagrammatically illustrates pertinent portions of exemplary embodiments of the transceiver of FIG. 2 in more detail. In FIG. 3, data is received from a single user and is divided into two beam signals. The beam weights (complex beam weights $w_1$ and $w_2$ in this example) used by phase/amplitude adjusters 25 (multipliers in this example) are received from the user's mobile station, and the antenna weights used by beamformer 1 ($w_{1,1}$, $w_{1,2}$, $w_{1,3}$ and $w_{1,4}$) and beamformer 2 ($w_{2,1}$, $w_{2,2}$, $w_{2,3}$ and $w_{2,4}$) are provided by the beam pattern determiner 23. Each beamformer applies four antenna weights to its associated phase/amplitude-adjusted beam signal, one antenna weight for each antenna. The four phase/amplitude-adjusted, antenna-weighted beam signals produced by each beamformer are combined (at summing modes 33), respectively, with the corresponding signals produced by the other beamformer. The left and right subscripts in the antenna weights designate the associated beam and the associated antenna, respectively.

Figure 4:
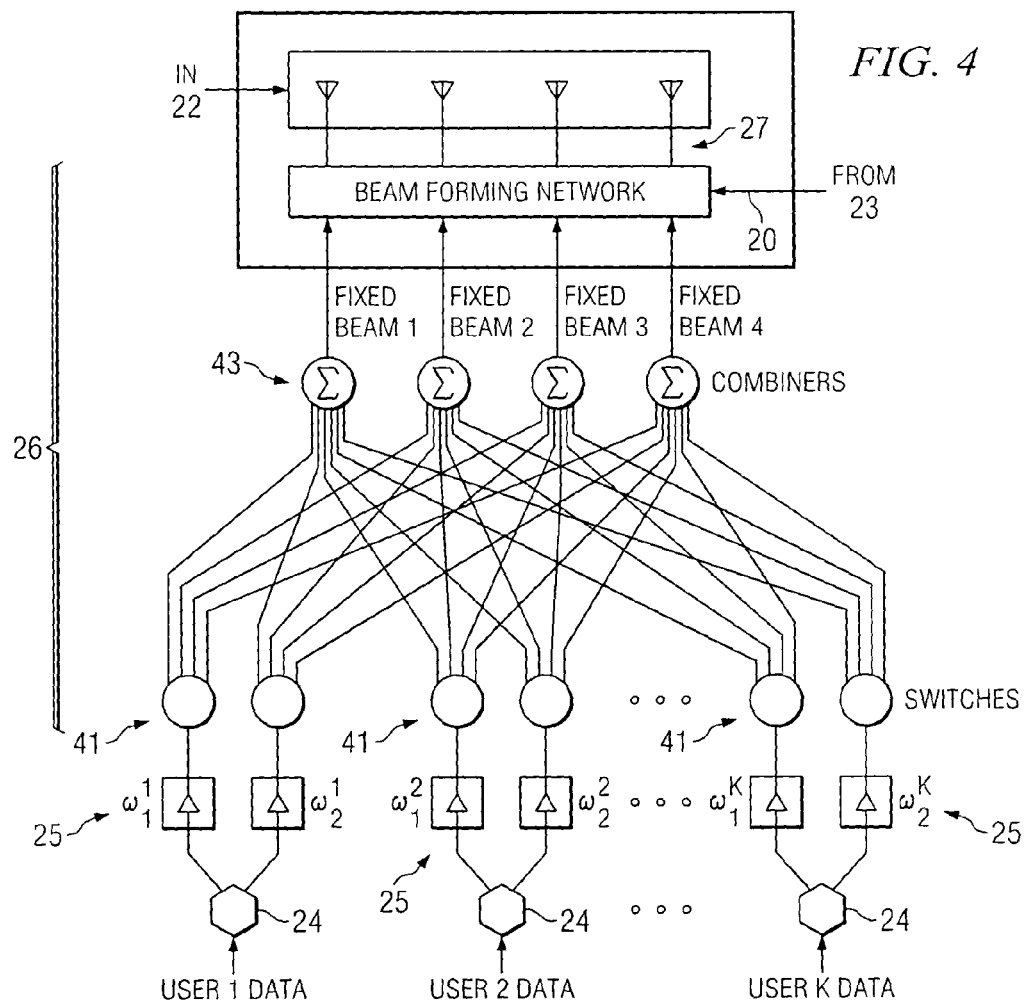
FIG. 4 diagrammatically illustrates some of the exemplary embodiments of FIG. 2 in more detail.

FIG. 4 diagrammatically illustrates pertinent portions of further exemplary embodiments of the transceiver apparatus of FIG. 2. FIG. 4 illustrates an example of K users. The user data streams are each divided into two beam signals, one for each of two beams. Also in FIG. 4, the outputs of each of the phase/amplitude adjusters 25 are switched at 41 to each of four combiners 43, whose respective outputs are applied to a conventional beamforming network. The beam weights ($w_1^k$ and $w_2^k$ for $k=1, \ldots K$ users) used by phase/amplitude adjusters 25 are received from the mobile station(s) and the beamforming network receives the beamforming information 20, for example antenna weights, produced by the beam pattern determiner 23 of FIG. 2.

Figure 5:
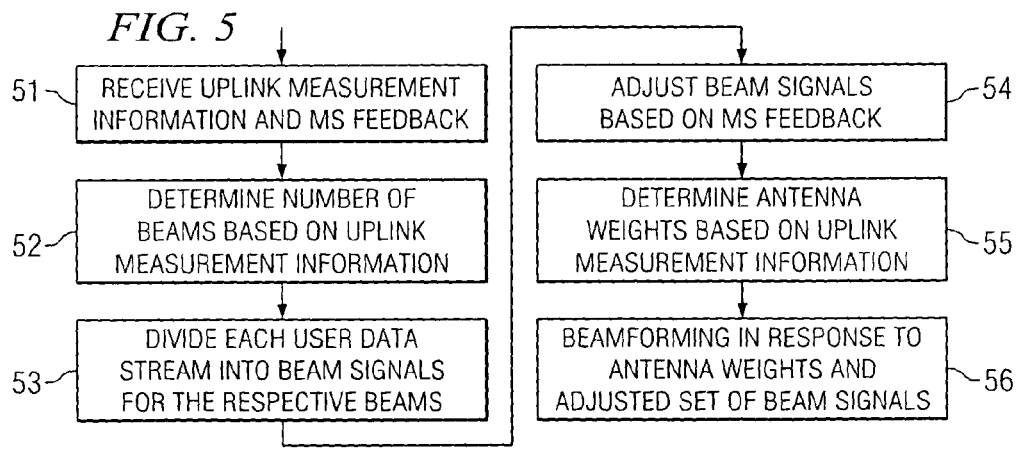
FIG. 5 illustrates exemplary operations which can be performed by the embodiments of FIGS. 2–4.

FIG. 5 illustrates exemplary operations which can be performed by the embodiments of FIGS. 2–4. The uplink measurement information and the closed loop transmit diversity feedback information from the mobile station(s) are received at 51. Thereafter at 52, the number of beams is determined based on the uplink measurement information. At 53, each user data stream is divided into a number of beam signals equal to the selected number of beams. At 54, one or more of the beam signals are adjusted as directed by the closed loop transmit diversity feedback information received from the mobile station(s), resulting in an adjusted set of beam signals. At 55, the antenna weights are determined. At 56, beamforming is performed in response to the antenna weights and the adjusted set of beam signals.

It should be apparent from the foregoing description that the present invention has the advantage of radiating the energy in certain directions (beamforming), which insures less interference to users located in other directions. In contrast, standard transmit diversity methods transmit energy, for example, through the entire cell. Due to the fact that the downlink beamforming weights are designed and selected by the transceiver that is performing the downlink transmission, and not by the individual mobile stations which are receiving the transmissions, the following advantages are obtained: system capacity, i.e. the number of users that the system can ultimately accommodate, is improved; system throughput, i.e. the total amount of data that the communication system can handle, is improved; because signals from multiple beams can be coherently combined at the mobile station(s), power consumption, i.e. the least amount of output power required to satisfy the requested QoS, is improved; cell coverage, i.e. ability to meet the demands from users far away from the downlink transceiver, is improved; and link quality, i.e. the ability to ensure that mobile users receive acceptable QoS, is improved.

The invention also provides an exemplary advantage in that closed loop transmit diversity signaling together with closed loop power control are exploited to monitor the quality of the physical layer signals and adjust the quality of the link. Also, the additional gain obtained by combining two downlink beams does not disadvantageously increase the level of interference to other users. In fact, in some embodiments, the average interference to other users is actually reduced, depending on the location of the other users.

Although exemplary embodiments of the invention are described above in detail, this does not limit the scope of the invention, which can be practiced in a variety of embodiments.

What is claimed is:

1. An apparatus for supporting downlink wireless communication to wireless mobile communication stations via a multi-beam antenna system, comprising:

an input for receiving a data stream associated with a wireless mobile communication station;

a divider coupled to said input for producing from said data stream a set of beam signals;

an adjuster coupled to said divider for receiving said beam signals, said adjuster including an input for receiving feedback information that the wireless mobile communication station has provided via a wireless communication link, said adjuster operable for adjusting at least one of said beam signals based on said feedback information to produce an adjusted set of beam signals;

a beamforming unit coupled to said adjuster for receiving therefrom said adjusted set of beam signals, said beamforming unit having an input for receiving beamforming control information, and said beamforming unit responsive to said adjusted set of beam signals and said beamforming control information for producing antenna information for the multi-beam antenna system; and an output coupled to said beamforming unit for providing said antenna information to the multi-beam antenna system, wherein said multi-beam antenna system generates at least two non-coherent fixed beams, and wherein said feedback information provided by said wireless mobile communication system comprises transmit diversity information derived from the reception of said at least two non-coherent fixed beams.

2. The apparatus of claim 1, wherein said adjuster is for phase-adjusting said at least one beam signal.

3. The apparatus of claim 2, wherein said adjuster is further for amplitude-adjusting said at least one beam signal.

4. The apparatus of claim 1, wherein said adjuster is for amplitude-adjusting said at least one beam signal.

5. The apparatus of claim 1, including a beam pattern determiner for determining a number of beams in a beam pattern to be implemented by the multi-beam antenna system, said beam pattern determiner coupled to said divider for providing thereto beam number information indicative of said number of beams, said divider responsive to said beam number information for providing said set of beam signals with a number of said beam signals equal to the number of beams.

6. The apparatus of claim 5, wherein said beam pattern determiner is further coupled to said beamforming unit input for providing thereto said beamforming control information.

7. The apparatus of claim 6, wherein said beam pattern determiner includes an input for receiving measurement information obtained from a wireless communication link, said beam pattern determiner responsive to said measurement information for determining said number of beams and for providing said beamforming control information.

8. The apparatus of claim 1, wherein said beamforming control information includes antenna weights.

9. The apparatus of claim 1, provided in a WCDMA base station, and wherein said feedback information is provided by the wireless mobile communication station using one of FBI and FSM.

10. The apparatus of claim 1, wherein said beamforming unit includes a plurality of beamformers for respectively receiving the beam signals of said adjusted set of beam signals, each said beamformer operable for producing in response to the associated beam signal and said beamforming control information a plurality of beamformer output signals, said beamforming unit further including a combiner coupled to said beamformers for combining said pluralities of beamformer output signals to produce said antenna information.

11. The apparatus of claim 1, wherein said beamforming unit includes a plurality of combiners, each said combiner for receiving each said beam signal of said adjusted set of beam signals, each said combiner responsive to the received beam signals for producing a corresponding combiner output signal, said beamforming unit including a beamforming network coupled to said combiners and responsive to said combiner output signals for producing said antenna information.

12. The apparatus of claim 1, wherein said adjuster includes a multiplier and said feedback information includes complex beam weights.

13. The apparatus of claim 1, including a plurality of said inputs, a plurality of said dividers, and a plurality of said adjusters, each said divider coupled to a corresponding one of said inputs, each said adjuster coupled to a corresponding one of said dividers, and said beamforming unit coupled to each of said adjusters.

14. A method of effectuating downlink wireless communication to a wireless mobile communication station via a multi-beam antenna system, comprising:

receiving a data stream associated with the wireless mobile communication station;

producing from said data stream a set of beam signals;

based on feedback information received from the wireless mobile communication station via a wireless communication link, adjusting at least one of said beam signals to produce an adjusted set of beam signals;

using the adjusted set of beam signals to perform a beamforming operation, including combining the adjusted set of beam signals with beamforming control information; and in response to said beamforming operation, operating the multi-beam antenna system for downlink wireless communication to the wireless mobile communication station, wherein said multi-beam antenna system generates at least two non-coherent fixed beams, and wherein said feedback information provided by said wireless mobile communication system comprises transmit diversity information derived from the reception of said at least two non-coherent fixed beams.

15. The method of claim 14, wherein said adjusting step includes one of phase-adjusting and amplitude-adjusting said at least one beam signal.

16. The method of claim 14, wherein said adjusting step includes phase-adjusting and amplitude-adjusting said at least one beam signal.

17. The method of claim 14, including determining a number of beams in a beam pattern to be implemented by the multi-beam antenna system, said producing step including providing said set of beam signals with a number of said beam signals equal to the number of beams.

18. The method of claim 17, wherein said determining step includes determining said number of beams in response to measurement information obtained from a wireless communication link, and including providing said beamforming control information in response to said measurement information.

19. The method of claim 18, wherein said measurement information includes one of uplink power measurement information and uplink quality measurement information.

20. The method of claim 14, including the wireless mobile communication station transmitting the feedback information via a WCDMA wireless communication link using one of FBI and FSM.

21. The method of claim 14, wherein said adjusting step includes multiplying said at least one beam signal by a complex beam weight.

22. An apparatus for performing downlink wireless communication to wireless mobile communication stations, comprising:
an input for receiving a data stream associated with a wireless mobile communication station;
a divider coupled to said input for producing from said data stream a set of beam signals;
an adjuster coupled to said divider for receiving said beam signals, said adjuster including an input for receiving feedback information that the wireless mobile communication station has provided via a wireless communication link, said adjuster operable for adjusting at least one of said beam signals based on said feedback information to produce an adjusted set of beam signals;
a beamforming unit coupled to said adjuster for receiving therefrom said adjusted set of beam signals, said beamforming unit having an input for receiving beamforming control information, and said beamforming unit responsive to said adjusted set of beam signals and said beamforming control information for producing antenna information; and
a multi-beam antenna system coupled to said beamforming unit and responsive to said antenna information for downlink transmitting to the wireless mobile communication station, wherein said multi-beam antenna system generates at least two non-coherent fixed beams, and wherein said feedback information provided by said wireless mobile communication system comprises transmit diversity information derived from the reception of said at least two non-coherent fixed beams.

23. The apparatus of claim 22, provided as a WCDMA base station.

24. The apparatus of claim 23, wherein said feedback information is provided by the wireless mobile communication station using one of FBI and FSM.

25. The apparatus of claim 22, wherein said adjuster is for one of phase-adjusting and amplitude-adjusting said at least one beam signal.

26. The apparatus of claim 22, wherein said adjuster is for phase-adjusting and amplitude-adjusting said at least one beam signal.

27. The apparatus of claim 22, wherein said beamforming unit includes a plurality of beamformers for respectively receiving the beam signals of said adjusted set of beam signals, each said beamformer operable for producing in response to the associated beam signal and said beamforming control information a plurality of beamformer output signals, said beamforming unit further including a combiner coupled to said beamformers for combining said pluralities of beamformer output signals to produce said antenna information.

28. The apparatus of claim 22, wherein said beamforming unit includes a plurality of combiners, each said combiner for receiving each said beam signal of said adjusted set of beam signals, each said combiner responsive to the received beam signals for producing a corresponding combiner output signal, said beamforming unit including a beamforming network coupled to said combiners and responsive to said combiner output signals for producing said antenna information.

29. The apparatus of claim 22, wherein said adjuster includes a multiplier and said feedback information includes complex beam weights.

30. The apparatus of claim 22, including a plurality of said inputs, a plurality of said dividers, and a plurality of said adjusters, each said divider coupled to a corresponding one of said inputs, each said adjuster coupled to a corresponding one of said dividers, and said beamforming unit coupled to each of said adjusters.

* * * * *

UNITED STATES PATENT AND TRADEMARK OFFICE
CERTIFICATE OF CORRECTION

PATENT NO.         : 7,151,951 B2
APPLICATION NO. : 10/328723
DATED                  : December 19, 2006
INVENTOR(S)       : Goransson et al.

It is certified that error appears in the above-identified patent and that said Letters Patent is hereby corrected as shown below:

On The Title Page, Item (56), under "U.S. PATENT DOCUMENTS", in Column 2, Line 11, delete "6,788,250 B1" and insert -- 6,788,250 B2 --, therefor.

In Column 5, Line 2, delete "multi-bema" and insert -- multi-beam --, therefor.

In Column 6, Line 17, delete "$w^{1k}$" and insert -- $w_1^k$ --, therefor.

Signed and Sealed this

Eighteenth Day of December, 2007

JON W. DUDAS
*Director of the United States Patent and Trademark Office*